(12) United States Patent
Schnell et al.

(10) Patent No.: US 10,300,622 B2
(45) Date of Patent: May 28, 2019

(54) BEARING DEVICE

(75) Inventors: Pascal Schnell, Baerschwil (CH); Tom Staeubli, Zürich (CH); Arno Lenzi, Zürich (CH); Hermann Schaible, Biberist (CH)

(73) Assignee: Robert Bosch GmbH, Stuttgart (DE)

( * ) Notice: Subject to any disclaimer, the term of this patent is extended or adjusted under 35 U.S.C. 154(b) by 1489 days.

(21) Appl. No.: 13/605,104

(22) Filed: Sep. 6, 2012

(65) Prior Publication Data

US 2013/0233447 A1 Sep. 12, 2013

(30) Foreign Application Priority Data

Sep. 7, 2011 (DE) .......................... 10 2011 082 276

(51) Int. Cl.
*B27C 5/10* (2006.01)
*B23Q 9/00* (2006.01)

(52) U.S. Cl.
CPC .............. *B27C 5/10* (2013.01); *B23Q 9/0007* (2013.01); *Y10T 409/306608* (2015.01)

(58) Field of Classification Search
CPC .. B27C 5/10; B27C 1/005; B27C 1/02; B27C 1/14; B27C 7/00; B27C 7/04; B27C 7/06; Y10T 409/306384; Y10T 409/306496
See application file for complete search history.

(56) References Cited

U.S. PATENT DOCUMENTS

| | | | |
|---|---|---|---|
| 4,572,715 A * | 2/1986 | Wolff | B23B 47/287 144/154.5 |
| 6,065,912 A | 5/2000 | Bosten et al. | |
| 7,448,420 B2 * | 11/2008 | Mair | B27C 1/005 144/136.95 |
| 2010/0132840 A1* | 6/2010 | Vidal Carres | B23Q 9/0028 144/136.95 |
| 2010/0206430 A1 | 8/2010 | Pozgay et al. | |

FOREIGN PATENT DOCUMENTS

DE 38 24 200 C1 8/1993
EP 2 191 946 A2 6/2010

* cited by examiner

*Primary Examiner* — Matthew Katcoff
(74) *Attorney, Agent, or Firm* — Maginot, Moore & Beck LLP

(57) ABSTRACT

A bearing device of a portable power tool, in particular a router, has at least one main body unit. The main body unit is formed as a corner guiding unit and has a bearing surface and a lead-through opening. The bearing surface is configured to bear on a workpiece. The lead-through opening is configured to receive an insert tool configured to perform work on a workpiece.

8 Claims, 2 Drawing Sheets

BEARING DEVICE

This application claims priority under 35 U.S.C. § 119 to patent application no. DE 10 2011 082 276.3, filed on Sep. 7, 2011 in Germany, the disclosure of which is incorporated herein by reference in its entirety.

BACKGROUND

Bearing devices of portable power tools, in particular of routers, with a main body unit that has a bearing surface configured to bear on a workpiece and a lead-through opening through which an insert tool configured to perform work on a workpiece is led, are already known.

SUMMARY

The disclosure is based on a bearing device of a portable power tool, in particular a router, with at least one main body unit that has at least one bearing surface configured to bear on a workpiece and at least one lead-through opening through which an insert tool configured to perform work on a workpiece is led.

It is proposed that the main body unit is a corner guiding unit. A "bearing device" is intended to be understood here as meaning in particular a device which, when the portable power tool is being handled properly while working a workpiece by means of a portable power tool, bears on the workpiece, in particular with the bearing surface of the main body unit, and which is provided to support the portable power tool on the workpiece during working of the workpiece. "Provided" is intended to be understood as meaning in particular specifically configured and/or specifically equipped for a purpose. Particularly preferably, the bearing device is a sliding shoe and/or a baseplate. The expression "lead-through opening" is intended here to define in particular an opening in the material of the main body unit that has a smaller material thickness in comparison with directly adjacent regions of the main body unit, in particular a material thickness of 0 mm. Particularly preferably, the lead-through opening is a through-bore. Particularly preferably, in a state of the main body unit in which it is coupled to the portable power tool, an insert tool arranged in a tool holder of a portable power tool is led through the lead-through opening to perform work on a workpiece on which the main body unit is bearing with the bearing surface.

A "corner guiding unit" is intended to be understood here as meaning in particular a unit which is bounded by two straight contour lines which intersect at at least one point, the unit being provided to enable guiding around a corner when placed against a guiding device configured to guide along the guiding device in isolation from setting down and while retaining an orientation of the unit, in particular while an insert tool is being driven by a drive unit of the portable power tool. The expression "straight contour line" is intended here to define in particular a straight line that is defined by at least two contour points of a contour of the unit and runs completely outside a surface area of the unit that is bounded by the contour. Preferably, the main body unit has a basic form in the form of a sector of a circle when considered in a plane running at least substantially parallel to the bearing surface. "In the form of a sector of a circle" is intended to be understood here as meaning in particular a geometrical shape of which the outer contour is formed by two straight lines connected to each other at a point of intersection and a line segment connecting the straight lines to each other at ends of the lines that are remote from the point of intersection. The line segment connecting the straight lines to each other has any shape that appears to be appropriate to a person skilled in the art, such as for example a shape as an arc of a circle, as a straight line, as a wavy connecting line, etc. "Substantially parallel" is intended to be understood here as meaning in particular an alignment of a direction in relation to a reference direction, in particular in a plane, the direction having a deviation with respect to the reference direction in particular of less than 8°, advantageously of less than 5° and particularly advantageously of less than 2°. The expression "basic form" is intended here to define in particular the profile of an outer contour of the main body unit extending in a plane running at least substantially parallel to the bearing surface. When the main body unit, in particular one of the guiding edges of the main body unit, is placed against a guiding surface of a guiding rail or the like, guidance during a movement of the main body unit along the guiding surface around a corner, in particular a 90° corner, is realized due to the configuration of the bearing device. Moreover, with a configuration of the main body unit as a corner guiding unit with a basic form in the form of a sector of a circle, a long guiding area of the main body unit is advantageously achieved, an area at which the main body unit is placed against a side face of a guiding device, such as for example a guide bar that is fixed on a workpiece, etc., to produce a straight removal of material from a workpiece, in particular removal of material from a workpiece produced with a routing tool. Moreover, as a result of the basic form of the main body unit in the form of a sector of the circle, a ploughing effect is advantageously achieved which enables removed workpiece particles to be advantageously pushed away from a location that is to be worked.

Furthermore, it is proposed that the main body unit has at least two guiding edges, which run at least substantially perpendicularly in relation to each other when considered in a plane running at least substantially parallel to the bearing surface. A "guiding edge" is intended to be understood here as meaning in particular the region of the main body unit that defines a profile of the basic form. The two guiding edges are formed particularly preferably by the two straight lines of the basic form of the main body unit. The guiding edges are preferably arranged on sides of the main body unit that are aligned at least substantially perpendicularly in relation to the bearing surface of the main body unit. The expression "substantially perpendicularly" is intended to be understood here as meaning in particular an alignment of a direction in relation to a reference direction, the direction and the reference direction enclosing an angle of 90°, in particular when considered in a plane, and the angle having a maximum deviation of in particular less than 8°, advantageously of less than 5° and particularly advantageously of less than 2°. Preferably, the angle that the guiding edges enclose is measured on a side of the guiding edges that is facing the main body unit. Due to the configuration according to the disclosure, in a state of the main body unit in which it is coupled to the portable power tool, an advantageously wide standing area is formed when the main body unit is tilted by 90° from the bearing surface, for example to carry out a change of the insert tool.

The at least two guiding edges are advantageously connected to each other by a further guiding edge of the main body unit that is an arc of a circle. Consequently, the line segment connecting the straight lines to each other is preferably formed as an arc of a circle. Here, the main body unit has one 90° corner and two rounded corners, which are arranged in the transitional region between the further guiding edge in the form of an arc of a circle and the guiding edges formed as straight lines. A large bearing surface is advantageously achieved and configured to stably set down the portable power tool coupled with the main body unit.

Furthermore, it is proposed that the bearing device has at least one guiding-device receiving unit, which is provided to fix a guiding device positively and/or non-positively on the main body unit, at least one guiding-device receiving element of the guiding-device receiving unit having a longitudinal extent that extends at least substantially parallel to one of the at least two guiding edges. A "guiding device" is intended here as meaning in particular a device which is provided to create a constraining force at least along a direction perpendicular to a direction of movement of the main body unit, in particular when the main body unit is placed in position, in particular one of the guiding edges of the main body unit is placed against a guiding surface of the guiding device, to predetermine a possibility for movement of the portable power tool along the direction of movement. A "constraining force" is intended here as meaning in particular a force which is provided to hinder a component from a movement in at least one direction and/or to keep the component on a path predetermined due to an effect of the force on the component during a movement. The guiding-device receiving unit is arranged on the main body unit on a side of the main body unit that is facing away from the bearing surface. A guiding device is fixed on the main body unit in a structurally simple manner.

Furthermore, the disclosure is based on a portable power tool with a bearing device according to the disclosure. A "portable power tool" is intended to be understood here as meaning in particular a power tool configured to perform work on workpieces that are transported by an operator without any mechanical transporting means. The portable power tool has in particular a mass which is less than 40 kg, preferably less than 10 kg and particularly preferably less than 5 kg. Particularly preferably, the portable power tool is a router. However, it is also conceivable for the portable power tool to have some other configuration that appears appropriate to a person skilled in the art. A high level of operating convenience is advantageously achieved by an operator of the portable power tool.

The portable power tool advantageously comprises at least one housing unit, which has a transverse direction of extent, which, in a state in which it is mounted on the main body unit, encloses an angle of less than 60° with one of at least two guiding edges of the main body unit. The housing unit is preferably a motor housing unit or a router cage. The motor housing unit is of a pot-like construction or a shell construction. Preferably, the motor housing unit is of a pot-like construction or a combination of a pot-like construction and a shell construction, in which at least two handle shells are connected to each other with connecting elements, such as for example screws, along a connecting plane that runs through a vertical axis of the portable power tool, in particular a stroke axis of the portable power tool. Particularly preferably, the housing unit is mounted on the main body unit linearly movably in relation to the main body unit of the bearing device with a linear guiding unit. The direction of transverse extent preferably extends substantially perpendicularly in relation to the stroke axis. The direction of transverse extent preferably runs from one handle to a further handle of the housing unit. The handle and the further handle are arranged on two sides of the housing unit that are facing away from each other. The handle and the further handle are provided to be gripped by an operator of the portable power tool to move and guide the portable power tool. An ergonomically appropriate posture of an operator when operating the portable power tool to perform work on a workpiece is advantageously achieved.

Preferably, the transverse direction of extent is an angle bisector with respect to an angle that is enclosed by the at least two guiding edges. Consequently, the direction of transverse extent respectively encloses an angle of 45° with one of the guiding edges. When guiding the portable power tool around a 90° corner, particularly convenient holding of the handles by an operator is advantageously achieved.

The bearing device according to the disclosure and/or the portable power tool according to the disclosure is/are not intended to be restricted here to the application and embodiment described above. In particular it is conceivable that, to accomplish a mode of operation described herein, the bearing device according to the disclosure and/or the portable power tool according to the disclosure have a number of individual elements, components and units that differs from the number stated herein.

BRIEF DESCRIPTION OF THE DRAWINGS

Further advantages emerge from the following description of the drawing. In the drawing, an exemplary embodiment of the disclosure is represented. The drawing, the description and the claims contain numerous features in combination. A person skilled in the art will also expediently consider the features individually and combine them to create appropriate further combinations.

In the drawing.

DETAILED DESCRIPTION

Figure 1:
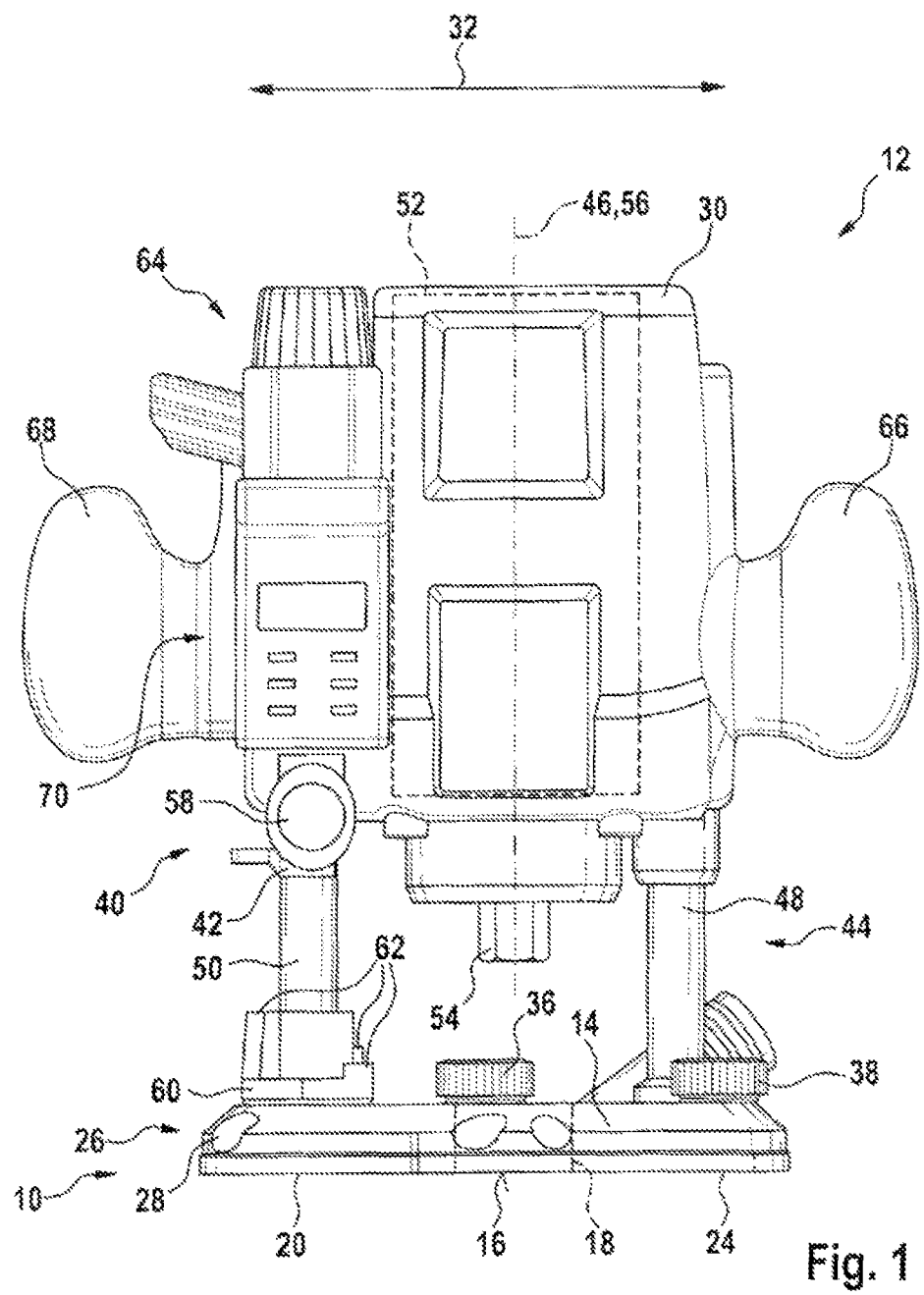
FIG. 1 shows the portable power tool in a schematic representation.

FIG. 1 shows a portable power tool 12, which is a router and comprises a bearing device 10, which comprises at least one main body unit 14, which has at least one bearing surface 16 configured to bear on a workpiece and a lead-through opening 18, through which an insert tool (not represented more specifically herein) configured to perform work on a workpiece (not represented more specifically herein) is led. The main body unit 14 is a corner guiding unit. Here, the main body unit 14 has a basic form of a sector of a circle. The main body unit 14 has at least two guiding edges 20, 22, which run substantially perpendicularly in relation to each other when considered in a plane running at least substantially parallel to the bearing surface 16. Consequently, the two guiding edges 20, 22 enclose an angle α of 90°. The angle α is measured on a side of the guiding edges 20, 22 that is facing the main body unit 14. The two guiding edges 20, 22 are also connected to each other by a further guiding edge 24 of the main body unit 14 that is an arc of a circle. Moreover, the two guiding edges 20, 22 have a geometrical configuration as straight lines. Here, the two guiding edges 20, 22 are placed against a guide bar 72 (FIG. 2) fastened on a workpiece to be worked or against an edge of a workpiece to be worked, or some other element that appears appropriate to a person skilled in the art to guide the portable power tool 12 during working of the workpiece. This allows a straight cutting path to be produced.

Figure 2:
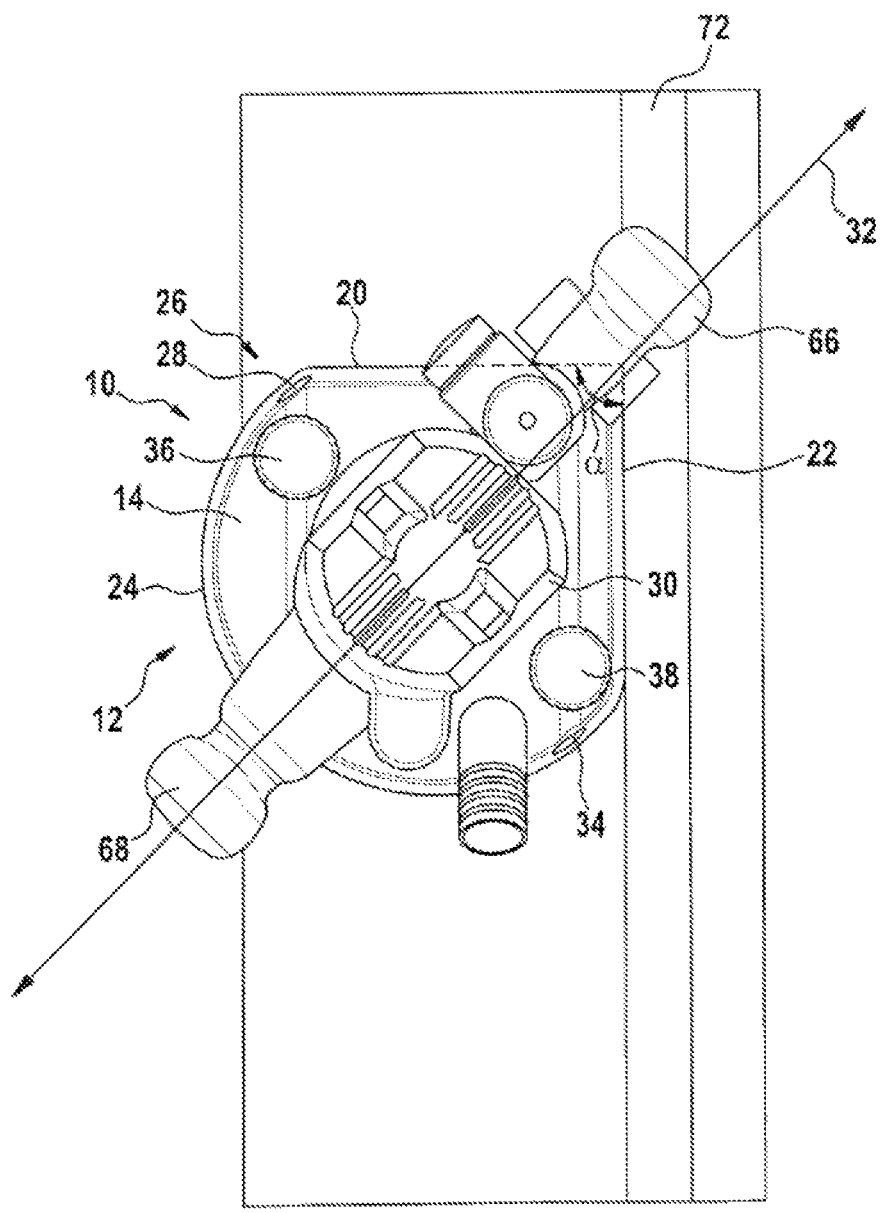
FIG. 2 shows in a schematic representation a plan view of the portable power tool in a state of a bearing device of the portable power tool in which it is bearing against a guiding surface.

Furthermore, the bearing device 10 has at least one guiding-device receiving unit 26, which is provided to fix a guiding device (not represented more specifically herein) positively and/or non-positively on the main body unit 14. At least one guiding-device receiving element 28, 34 of the guiding-device receiving unit 26 has a longitudinal extent that extends at least substantially parallel to one of the at least two guiding edges 20, 22 (FIG. 2). The guiding-device receiving elements 28, 34 are arranged on the main body unit 14 on a side of the main body unit 14 that is facing away from the bearing surface 16. Moreover, the guiding-device receiving elements 28, 34 are cylindrical openings, into which rod-shaped positioning elements (not represented more specifically herein) of the guiding device are inserted. However, it is also conceivable for the guiding-device receiving elements 28, 34 to have some other configuration that appears appropriate to a person skilled in the art. The positioning elements are fixable in a position in relation to the main body unit 14 with fixing elements 36, 38 of the guiding-device receiving unit 26. The fixing elements 36, 38 are fixing screws. However, it is also conceivable for the fixing elements 36, 38 to have some other configuration that appears appropriate to a person skilled in the art.

Furthermore, the portable power tool 12 comprises a housing unit 30, which is mounted movably in relation to the main body unit 14, and has a coarse cutting-depth setting unit 40, which has at least one movement-limiting element 42 to set a length of a path of movement of the housing 30 in relation to the main body unit 14. The housing unit 30 is a motor housing unit, in which a drive unit 52 of the portable power tool 12 is arranged. The drive unit 52 is an electric motor, which is provided to drive a tool holder 54 of the portable power tool 12 in a rotating manner. However, it is also conceivable for the drive unit 52 to have some other configuration that appears appropriate to a person skilled in the art, such as for example a configuration as a pneumatic motor or as an internal combustion engine, etc. The tool holder 54 is a collet, which is provided to receive an insert tool (not represented more specifically herein) configured to perform work on a workpiece (not represented more specifically herein).

The coarse cutting-depth setting unit 40 comprises the movement-limiting element 42, which is arranged displaceably at least substantially parallel to an axis of rotation 56 of the tool holder 54 and is arrested with a clamping screw 58 of the coarse cutting-depth setting unit 40. Furthermore, the coarse cutting-depth setting unit 40 comprises a turret stop 60, which is arranged rotatably on a side of the main body unit 14 that is facing the housing unit 30 and has in a known way stop elements 62 which are provided to stop the movement-limiting element 42 during a movement of the housing unit 30 formed as a motor housing unit in the direction of the main body unit 14. Furthermore, the portable power tool 12 has a fine cutting-depth setting unit 64 for a fine setting of a characteristic variable of the portable power tool 12. The characteristic variable is a stroke. The fine setting of the characteristic variable with the fine cutting-depth setting unit 64 takes place here with a mechanical mechanism already known to a person skilled in the art (for example, patent no. DE 38 24 200 C1). The portable power tool 12 formed as a router consequently has at least substantially a configuration that is already known to a person skilled in the art.

Furthermore, the portable power tool 12 has a linear guiding unit 44, with which the housing unit 30 is mounted linearly movably in relation to the main body unit 14. The housing unit 30 is mounted translatorily movably in relation to the main body unit 14 along a stroke axis 46 of the portable power tool 12 with the linear guiding unit 44. Here, the linear guiding unit 44 comprises two guiding elements 48, 50. In a mounted state, the guiding elements 48, 50 run at least substantially parallel to each other. Furthermore, in a mounted state, the guiding elements 48, 50 extend at least substantially perpendicularly in relation to the bearing surface 16 of the main body unit 14, with which the main body unit 14 bears on the workpiece during working of a workpiece. The guiding elements 48, 50 are fixedly connected to the main body unit 14 in a manner already known to a person skilled in the art with a press connection. The guiding elements 48, 50 are hollow cylinders.

Furthermore, the linear guiding unit 44 comprises two spring elements (not represented more specifically herein). However, it is also conceivable for the linear guiding unit 44 to comprise a number of spring elements other than two. The spring elements are provided to subject the housing unit 30 to spring forces in a direction away from the main body unit 14. The spring elements are arranged in the guiding elements 48, 50 in a manner already known to a person skilled in the art. Moreover, guiding rods (not represented more specifically herein) of the linear guiding unit 44 are arranged in the guiding elements 48, 50. The guiding rods are surrounded by the spring elements. The spring elements are respectively supported inside the guiding elements 48, 50 by one end on the respective guiding element 48, 50 and/or the main body unit 14 and the spring elements are respectively supported by another end on a driving continuation (not represented more specifically herein) of the respective guiding rod. The guiding rods are respectively fixedly connected to the housing unit 30 on a side that is facing away from the main body unit 14.

Moreover, the housing unit 30 has a transverse direction of extent 32, which, in a state in which it is mounted on the main body unit 14, encloses the angle α of less than 60° with one of the two guiding edges 20, 22 of the main body unit 14. The direction of transverse extent 32 is an angle bisector with respect to the angle α that is enclosed by the at least two guiding edges 20, 22. The direction of transverse extent 32 runs from one handle 66 of the housing unit 30 to a further handle 68 of the housing unit 30.

The portable power tool 12 also has a display unit 70, which is provided to display to an operator a cutting depth of an insert tool arranged in the tool holder 54. The display device 70 is arranged on the housing unit 30. Here, the display unit 70 is a digital display unit 70. However, it is also conceivable for the display unit 70 to have some other configuration that appears appropriate to a person skilled in the art, such as for example a configuration as an analog display unit.

What is claimed is:
1. A bearing device of a portable power tool comprising:
at least one main body unit configured as a corner guiding unit having:
at least one bearing surface configured to bear on a workpiece;
two guiding edges which intersect each other at a 90° angle when considered in a plane which runs substantially parallel to the at least one bearing surface;
a further guiding edge configured as an arc of a circle, the guiding edges connected to each other via the further guiding edge;
at least one bore through which an insert tool configured to perform work on a workpiece is led, the at least one bore extending through the at least one main body unit in a direction perpendicular to the at least one bearing surface; and at least one guiding-device receiving element formed in the at least one main body unit, the at least one guiding-device receiving element extending substantially parallel to one of the two guiding edges, the at least one guiding-device receiving element configured to fix a guiding device on the at least one main body unit.

2. A portable power tool with a bearing device comprising:

at least one main body unit configured as a corner guiding unit having:
at least one bearing surface configured to bear on a workpiece;
two guiding edges which intersect each other at a 90° angle when considered in a plane which runs substantially parallel to the at least one bearing surface;
a further guiding edge configured as an arc of a circle, the guiding edges connected to each other via the further guiding edge;
at least one bore through which an insert tool configured to perform work on a workpiece is led, the at least one bore extending through the at least one main body unit in a direction perpendicular to the at least one bearing surface; and
at least one guiding-device receiving element formed in the at least one main body unit, the at least one guiding-device receiving element extending substantially parallel to one of the two guiding edges, the at least one guiding-device receiving element configured to fix a guiding device on the at least one main body unit.

3. The portable power tool of claim 2, further comprising:
at least one housing unit having at least one handle directly coupled only to the at least one housing unit, wherein:
the at least one handle extends from the at least one housing unit along a direction that is parallel to the at least one bearing surface, and
the at least one housing unit, when mounted on the at least one main body unit, forms an angle of less than 60° between the direction in which the at least one handle extends and one of the two guiding edges of the at least one main body unit.

4. The portable power tool of claim 3, wherein the direction in which the at least one handle extends bisects the 90° angle at which the two guiding edges intersect one another.

5. A portable power tool with a bearing device comprising:
at least one main body unit configured as a corner guiding unit having:
at least one bearing surface configured to bear on a workpiece;
two guiding edges which intersect each other at a 90° angle when considered in a plane which runs substantially parallel to the at least one bearing surface;
a further guiding edge configured as an arc of a circle, the guiding edges connected to each other via the further guiding edge; and
at least one bore through which an insert tool configured to perform work on a workpiece is led; and
a housing unit coupled to the at least one main body unit, the housing unit including a handle directly coupled only to the housing unit, the handle extending from the housing unit along a direction that is parallel to the at least one bearing surface, the direction in which the handle extends bisecting the angle at which the at least two guiding edges intersect each other when considered in the plane which runs substantially parallel to the at least one bearing surface.

6. The bearing device of claim 1, wherein:
the guiding edges and the further guiding edge form a perimeter; and
the at least one bore is formed through the at least one main body unit within the perimeter.

7. The bearing device of claim 1, wherein:
the at least one guiding-device receiving element extends through the further guiding edge.

8. The bearing device of claim 1, wherein:
the at least one guiding-device receiving element includes two guiding-device receiving elements; and
both of the guiding-device receiving elements extend through the further guiding edge.

* * * * *